(12) United States Patent
Gupta (10) Patent No.: US 10,362,473 B2
(45) Date of Patent: Jul. 23, 2019

(54) DEVICE, SYSTEM AND METHOD OF HPLMN PREFERRED EPDG SELECTION IN ROAMING SCENARIOS

(71) Applicant: Intel IP Corporation, Santa Clara, CA (US)

(72) Inventor: Vivek Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/567,330

(22) PCT Filed: Sep. 25, 2015

(86) PCT No.: PCT/US2015/052409
§ 371 (c)(1),
(2) Date: Oct. 17, 2017

(87) PCT Pub. No.: WO2016/186684
PCT Pub. Date: Nov. 24, 2016

(65) Prior Publication Data
US 2018/0091967 A1 Mar. 29, 2018

Related U.S. Application Data

(60) Provisional application No. 62/163,218, filed on May 18, 2015.

(51) Int. Cl.
*H04W 4/00* (2018.01)
*H04W 8/02* (2009.01)
(Continued)

(52) U.S. Cl.
CPC ............ *H04W 8/02* (2013.01); *H04W 48/14* (2013.01); *H04W 8/12* (2013.01); *H04W 48/18* (2013.01)

(58) Field of Classification Search
USPC ................................ 370/331, 338; 455/432.1
See application file for complete search history.

(56) References Cited

U.S. PATENT DOCUMENTS

2013/0272287 A1   10/2013   Xiang et al.
2014/0241333 A1   8/2014    Kim et al.
(Continued)

FOREIGN PATENT DOCUMENTS

CN       107637160        1/2018
EP       2237610 A1       10/2010
(Continued)

OTHER PUBLICATIONS

"European Application Serial No. 15892781.0, Extended European Search Report dated Sep. 25, 2018", 12 pgs.
(Continued)

*Primary Examiner* — David Q Nguyen
(74) *Attorney, Agent, or Firm* — Schwegman Lundberg & Woessner, P.A.

(57) ABSTRACT

User equipment (UE), and access point (AP) of an unsecured network and method of providing a quasi-orthogonal multiple access (QOMA) resources are generally described. The UE may determine whether it is roaming and if not connect to a home public land mobile network (HPLMN) Enhanced Packet Data Gateway (ePDG). The UE, when roaming, may retrieve ePDG selection information indicating to which of the HePDG and a visited public land mobile network (VPLMN) ePDG (VePDG) to attempt to connect, and connect to whichever of the HePDG and the VePDG is indicated by the ePDG selection information. The UE, when roaming and cannot connect to any PLMN, may extract from the ePDG selection information a default fully qualified domain name (FQDN) corresponding to a particular PLMN and connect to the ePDG corresponding to the particular PLMN through the AP based on the default FQDN.

17 Claims, 4 Drawing Sheets

(51) Int. Cl.
*H04W 48/14* (2009.01)
*H04W 48/18* (2009.01)
*H04W 8/12* (2009.01)

(56) References Cited

U.S. PATENT DOCUMENTS

| | | | |
|---|---|---|---|
| 2014/0295913 A1 | 10/2014 | Gupta | |
| 2015/0350983 A1* | 12/2015 | Kwok | H04L 65/1069 370/331 |
| 2018/0139692 A1* | 5/2018 | Liu | H04W 48/18 |

FOREIGN PATENT DOCUMENTS

| | | |
|---|---|---|
| EP | 2603046 | 6/2013 |
| JP | 2012510765 A | 5/2012 |
| WO | WO-2014129794 A1 | 8/2014 |

OTHER PUBLICATIONS

Gemalto, N V, "Selection of ePDG based on home operator preference in case of RAN-based", 3GPP Draft; C1-151552_(WAS_1287)-24302-REL13-Home-EPDG-Selection-For-RAN-Based, 3rd Generation Partnership Project (3GPP), Mobile Competence Centre; 650, Route Des Lucioles; F-06921 Sophia-Antipolis vol. CT WG1. no. Bratislava (Slovakia), [Online] Retrieved from the internet:http: www.3gpp.org ftp tsg_ct WG1_mm-cc-sm_ex-CN1 TSGC1_91_Bratislava docs , (Apr. 20, 2015), 4 pgs.

Qualcomm, Incorporated, "ePDG selection", 3GPP Draft; C1-151936-EPDG Selection DP, 3rd Generation Partnership Project (3GPP), Mobile Competence Centre; 650. Route Des Lucioles; F-06921 Sophia-Antipolis Cedex; France vol. CT WG1, no. Sanya; May 25, 2015-May 29, 2015, XP050970431, [Online] Retrieved from the internet:http: www.3gpp.org ftp tsg_ct WG1 mm-cc-sm_ex-CN1 TSGC1_92_Sanya docs , (May 15, 2015), 1-3.

"International Application Serial No. PCT/US2015/052409, International Preliminary Report on Patentability dated Nov. 30, 2017", 7 pgs.

"3GPP; TSG-SA; Architecture enhancements for non-3GPP access (Release 12)", 3GPP TS 23.402 V12.4.0, (Mar. 10, 2014).

"International Application Serial No. PCT/US2015/052409, International Search Report dated Feb. 18, 2016", 9 pgs.

"International Application Serial No. PCT/US2015/052409, Written Opinion dated Feb. 18, 2016", 5 pgs.

"European Application Serial No. 15892783.0, Communication pursuant to Article 94(3) EPC dated May 13, 2019", 7 pgs.

"European Application Serial No. 15892783.0, Response Filed Apr. 15, 2019 to Extended European Search Report dated Sep. 25, 2018", 33 pgs.

"Japanese Application Serial No. 2017-554439, Notification of Reasons for Refusal dated Apr. 23, 2019", w/ English translation, 10 pgs.

Alcatel-Lucent, et al., "A solution for ePDG selection", 3GPP Draft; S2-151421, 2 pgs.

Alcatel-Lucent, "Alcatel-Lucent Shanghai Bell, Selection of ePDG based on home operator preference", 3GPP TSG-CT WG1#91 C1_151586, (Apr. 20, 2015), 5 pgs.

Intel, "Solution principles for 52b", 3GPP TSG-SA WG2#108 S2-151066, (Apr. 7, 2015), 4 pgs.

Qualcomm, Incorporated, "Key Issues on Connectivity Establishment", 3GPP Draft; S2-151248, 2 pgs.

* cited by examiner

DEVICE, SYSTEM AND METHOD OF HPLMN PREFERRED EPDG SELECTION IN ROAMING SCENARIOS

PRIORITY CLAIM

This application is a U.S. National Stage Filing under 35 U.S.C. 371 from International Application No. PCT/US2015/052409, filed Sep. 25, 2015 and published in English as WO 2016/186684 on Nov. 24, 2016, which claims the benefit of priority to U.S. Provisional Patent Application Ser. No. 62/163,218, filed May 18, 2015, and entitled "HPLMN PREFERRED EPDG SELECTION IN ROAMING SCENARIOS," each of which is incorporated herein by reference in its entirety.

TECHNICAL FIELD

Embodiments pertain to radio access networks. Some embodiments relate to connectivity scenarios in cellular networks, including Third Generation Partnership Project Long Term Evolution (3GPP LTE) networks and LTE advanced (LTE-A) networks as well as 4th generation (4G) networks and $5^{th}$ generation (5G) networks.

BACKGROUND

The use of personal communication devices has increased astronomically over the last two decades. The penetration of mobile devices (user equipment or UEs) in modern society has continued to drive demand for a wide variety of networked devices in a number of disparate environments. The use of networked devices using 3GPP LTE systems has increased in all areas of home and work life. Because of the sometimes bewildering variety of existing devices and networks, delivering the appropriate communication capabilities for a particular subscriber and UE may be exceedingly complex. This may be in particular true in the frequent instances in which the UE roams from its home network. In this case, the UE may be constrained to use visited public land mobile network (VPLMN) resources and policies even if the UE desires to use home public land mobile network (HPLMN) resources and policies. This may be particularly problematic in cases in which untrustworthy connectivity scenarios exist in the VPLMN, such as accessing the 3GPP LTE system using an untrusted wireless local area network (WLAN).

It may thus be desirable to provide the capability of the UE to use selectable preferences for connectivity in roaming scenarios.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi.

Figure 1:
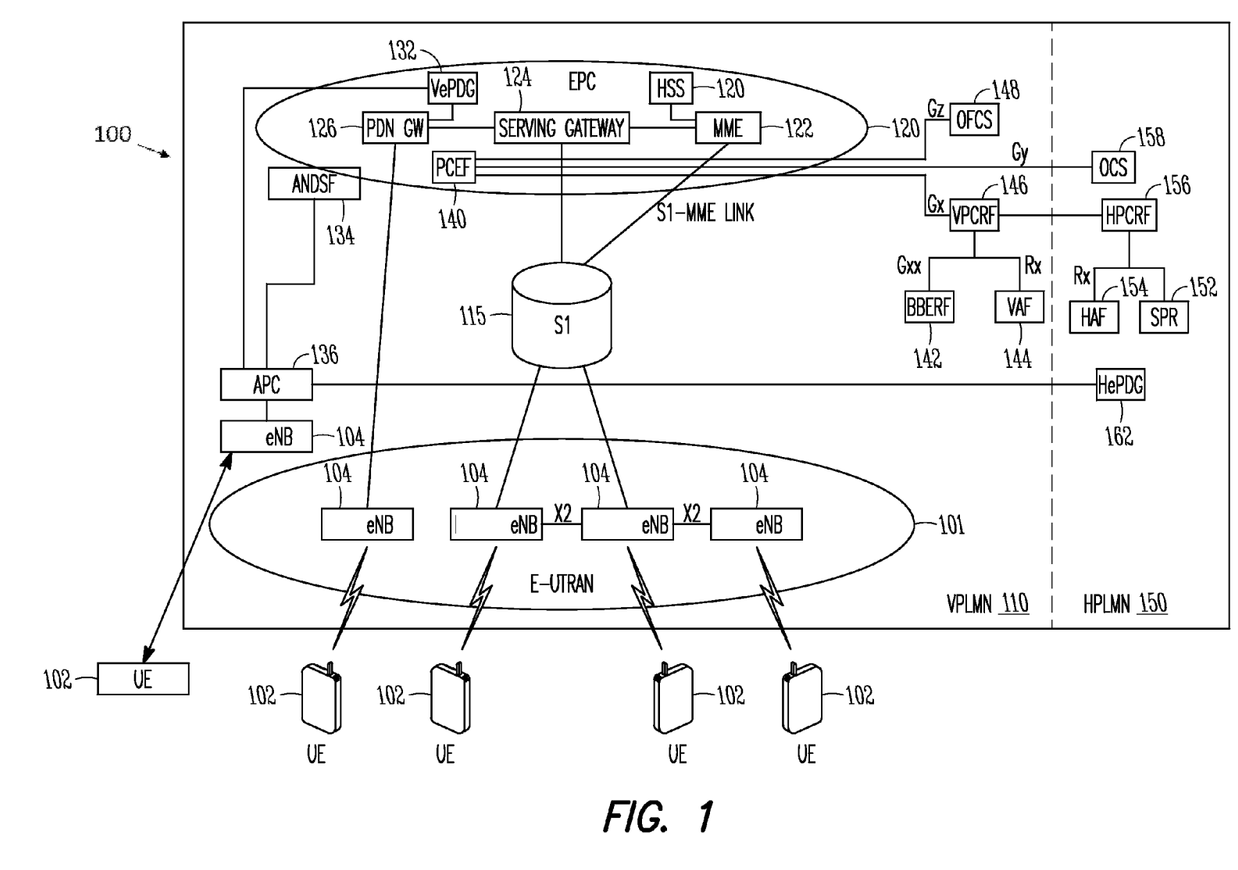
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes eNBs 104 (which may operate as base stations) for communicating with UE 102. The eNBs 104 may include macro eNBs and low power (LP) eNBs. The LP eNBs 104 may be access points (APs) configured to communicate with the UEs 102 via IEEE 802.11 communications. An access point controller (APC) may be disposed between the AP 104 and ePDGs 132, 162.

The MME 122 is similar in function to the control plane of legacy Serving GPRS Support Nodes (SGSN). The MME 122 manages mobility aspects in access such as gateway selection during initial attachment of the UEs and at intra-LTE handover, tracking area list management, paging and tagging procedures, bearer activation/deactivation, user authentication and generation and allocation of temporary identities to UEs. The MME 122 also determines authorization of the UE to use the PLMN of the service provider and enforces UE roaming restrictions. The MME 122 may be connected with a Home Subscriber Server (HSS) 128 that contains user-related and subscription-related information. The HSS 128 may support mobility management, call and session establishment support, user authentication and access authorization.

The serving GW 124 may terminate the interface toward the RAN 100, and route traffic packets (such as data packets or voice packets) between the RAN 100 and the core network 120. In addition, the serving GW 124 may be a local mobility anchor point for inter-eNB handovers and also may provide an anchor for inter-3GPP mobility. Other responsibilities of the serving GW 124 may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route traffic packets between the EPC 120 and the external PDN, and may be a key node for policy enforcement and charging data collection. The PDN GW 126 may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with some embodiments, UEs 102 may be configured to communicate via orthogonal multiple access (OMA) communications such as Time Division Multiple Access (TDMA), Frequency Division Multiple Access (FDMA) Orthogonal FDMA (OFDMA), SC-FDMA or other communication signals with an eNB 104 over a multicarrier communication channel in accordance with the appropriate communication technique. The OFDM signals may comprise a plurality of orthogonal subcarriers. In accordance with some embodiments, UEs 102 may be configured to communicate via non-orthogonal multiple access (NOMA) signals.

The S1 interface 115 may separate the RAN 100 and the EPC 120. The S1 interface 115 may be split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

FIG. 1 also includes Policy and Charging Control (PCC) architecture. The PCC architecture may include, among others, an Application Function (AF) 144, 154, a Policy and Charging Rules Function (PCRF) 146, 156, a Policy and Control Enforcement Function (PCEF 140) 140, a Subscription Profile Repository (SPR) 152 that may store user policy charging control subscription information, a Bearer Binding and Event Reporting Function (BBERF) 142, an Online Charging System (OCS) 158 and an Offline Charging System (OFCS) 148, an authentication, authorization, and accounting (AAA) server (not shown) that may handle UE requests for access to computer resources and provide authentication services and an Access Network Discovery and Selection Function (ANDSF) server 134 that may provide discovery information to the UE about connectivity to 3GPP and non-3GPP access networks (such as Wi-Fi) that are owned by the UE operator or have roaming agreements with the UE operator.

The ANDSF server 134 may assist the UE to discover non-3GPP access networks, such as WiFi networks, in the vicinity of the UE and to provide rules to prioritize and manage connections to the non-3GPP access networks. The ANDSF server 134 may aid in obtaining efficient use of licensed bandwidth through offloading traffic flow to and from the UE via a WLAN or other network rather than use a 3GPP or other cellular wireless network by providing policies and preferences using one or more ANDSF policies. The ANDSF server 134 may have defined mechanisms that enable UEs to determine which access technology is preferable for connection and/or for certain IP traffic under specific conditions, e.g., through the use of an inter-system mobility policy (ISMP) and/or inter-system routing policy (ISRP). An ANDSF client may run on UE and interact with the ANDSF server 134 using an Open Mobile Alliance Device Management (OMA-DM) protocol over the S14 interface. The ANDSF information may be provided in a query-response in which request may include the location and capability (e.g., supported interfaces) of the UE while the response may include the type of access (e.g., WiFi, WiMax), the RAN ID (e.g., SSIDs of the available WLANs), and technology-specific information such as one or more carrier frequencies. The ANDSF server 134 may be facilitated within the EPC 120 and connected with an access point controller (APC) 136.

The different functions may be provided in various servers and modules disposed throughout the RAN 100. A PCEF 140 may be located in the VPLMN 110. Policy and charging rules may be transmitted from the home network PCRF (HPCRF) 156 to the visited network PCRF (VPCRF) 146 via an S9 interface. The rules may subsequently be transmitted to the visited network PCEF 140 via a Gx interface and transmitted to the visited network BBERF 142 via a Gxx interface. The visited network PCEF 140 may be connected to the visited network OFCS 148 and to the home network OCS 158 via a Gy interface.

The PCRF 146, 156, as shown, may include the HPCRF 156 and VPCRF 146. The PCRF 146, 156 may provide policy and charging rules to the PCEF 140 for enforcement. The PCRF 146, 156 may also compare the rules and the UE subscription information to ensure compliance.

In some embodiments, the PCRF 146, 156 may obtain information from the AF 144, 154, SPR 152 and the PCEF 140. More specifically, in some embodiments, the AF 144, 154 may provide service information of the UE when the UE attaches to the RAN 100 and parameter negotiation is performed. The PCRF 146, 156 may accept the negotiation if the service information is consistent with the PCRF policy or may reject the negotiation and provide service parameters acceptable to the PCRF 146, 156 to the AF 144, 154, which may subsequently return the acceptable parameters to the UE.

Similarly, in some embodiments, the PCEF 140 may provide RAN information related to the bearer to the PCRF 146, 156. The PCEF 140 may enact the PCRF policy and charging rules on the service data flow on the bearer plane. The PCEF 140 may control service flows dependent on the UE QoS according to the PCRF rules after a bearer is established. The PCEF 140 may also implement online and/or offline charging dependent on the PCRF charging rules. The PCEF 140 may correspondingly communicate with the OCS 158 for online charging and OFCS 148 for offline charging to obtain charging information. The PCEF 140 may be located inside the serving GW 124, PDN GW 126 or Evolved Packet Data Gateway (ePDG) 132.

The BBERF 142 may be disposed in the serving GW 124, another PDN GW (not shown) or the ePDG 132. The gateway may depend on whether the UE 102 accesses the RAN 100 via the E-UTRAN 101 (serving GW 124), a trusted non-3GPP network (other PDN GW) or an untrusted non-3GPP access system (ePDG 132). The ePDG 132 may secure data transmission between a UE 102 and the EPC using an untrusted non-3GPP access by acting as a termination node of IPsec tunnels established with the UE 102. One example of untrusted access may be a connection over a public WiFi hotspot or other network connection that a network operator may not consider trustable from a security standpoint. The ePDG 132 may map IPSec tunnels into General Packet Radio Service (GPRS) Tunneling Protocol (GTP) or Proxy Mobile IPv6 (PMIP) tunnels terminated at the PDN GW 126. Note that while only a single one of each gateway is shown, there may be a plurality of each of one or more of the different gateways, such as the ePDG 132. Moreover, the elements shown, such the EPC 120, ePDG 132, E-UTRAN 101, etc. . . . may be present in each of the VPLMN 110 and HPLMN 150.

Figure 2:
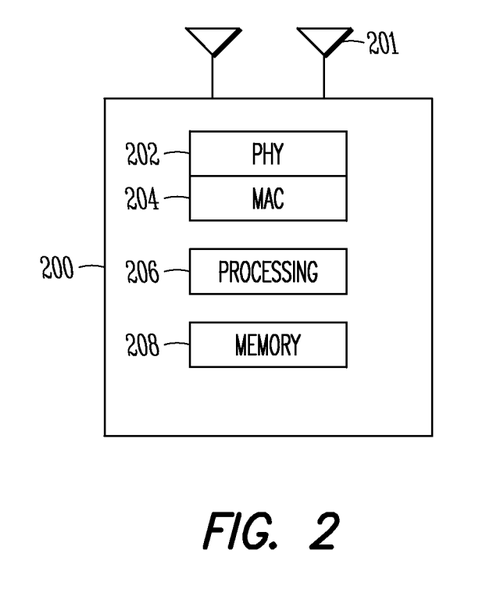
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a sensor, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As above, delivery of the appropriate communication capabilities for a particular UE may be constrained to use VPLMN resources and policies even if the UE desires to use HPLMN resources and policies. In some embodiments, a greater flexibility may be desirable to enable selectable connectivity preferences for the UE to use when roaming from the home network of the UE. To this end, work has recently been taking place on IR.51, which defines an IP Multimedia Subsystem (IMS) Profile for Voice, Video and Short Messaging Service (SMS) over Wi-Fi based on the 3GPP specifications and uses 3GPP specifications for ePDG selection in untrusted S2b (PGW-ePDG) connectivity scenarios. In other words, a minimum mandatory set of features defined in 3GPP specifications may be identified that the UE and network are to implement to guarantee interoperable, high quality IMS-based telephony and conversational video services over Wi-Fi access networks.

In some embodiments, when the UE roams from the HPLMN to a VPLMN, the UE may access the network using an unsecured WiFi connection via an AP. An IPSec tunnel may be created between the UE and an ePDG. In particular, the UE may typically first attempt to connect to one of the VPLMN ePDGs. If the connection is unsuccessful or not authenticated, thereafter the UE may attempt to connect with one of the HPLMN ePDGs. In some Voice-over-WiFi (VoWiFi) deployment scenarios in which one or more of the HPLMN ePDGs are reachable and available, however, it may be desirable for the UE to initially connect to one of the HPLMN ePDGs. Such deployment scenarios include when the visited network has not deployed VoWiFi services as yet or not enough interoperability testing has been performed to ensure that VoWiFi service in the visited network is operative. Moreover, even if the VPLMN is able to provide the requested service (such as VoWiFi), it may be desirable for the UE to connect with one of the HPLMN ePDGs if roaming agreements between the home and visited network operators, in which the roaming agreement defines how a visiting UE may access a desired service in its home network via the visited network, are lacking.

In current 3GPP specifications the UE may connect to ePDG corresponding to the home operator when the UE is in the HPLMN; there is no mechanism, however, currently to allow the UE to select a HPLMN ePDG in roaming scenarios involving visited operators. In roaming scenarios, the UE may instead typically use VPLMN resources. Hence, in roaming scenarios, preference is generally given to VPLMN policies to support handover of local breakout PDN connections even when HPLMN policies are desired.

To overcome this, in some embodiments, selection of HPLMN-based ePDG may be dependent on pre-configured HPLMN preferences or dynamic policies available from the UE home operator, such as through one or more ANDSF Management Objects (MOs). The HPLMN preferences may have a higher priority than VPLMN preferences and be used only under specific circumstances instead of being a hard-default configuration.

Thus, some embodiments relate to a mechanism to selectively connect the UE to a HPLMN ePDG in roaming scenarios based on home/visited operator preferences. The manner in which the UE is able to obtain the HPLMN ePDG address and connect to the HPLMN ePDG is described in more detail below. In some embodiments, this may be equally applicable to situations involving lawful intercept and emergency scenarios, in each of which different routing may occur than under normal communication conditions.

The UE, when accessing the 3GPP network via an AP of an unsecured network while roaming, may obtain a list of reachable ePDGs from the AP, and may make a decision based on the list. The HPLMN ePDG may be selected by the UE in some circumstances, such as if it is reachable by the APC. In some embodiments, the UE may store a pre-configured or otherwise static configuration to select the HPLMN ePDG. The configuration may be stored in a configuration file in removable or non-removable memory of the UE, such as a Universal Integrated Circuit Card (UICC) or other non-volatile storage in the UE.

One or more ANDSF MOs may also be pre-configured in the UE, in the same memory or a different memory as that in which the configuration file is stored. The ANDSF MOs may be configuration parameters in the hierarchical device management structure that include network selection rules. The ANDSF MOs may be structured in an eXtensible Markup Language (XML) format, and may be pulled from or pushed to the UE. Information regarding the UE and appropriate ePDG connection information may be communicated to and stored by the ANDSF server. In some embodiments, the UE may instead or in addition be configured to identify an access network and establish a connection with one or more RATs of the access network based on the relative priorities of the RATs dependent on the network selection rules.

In some embodiments, the HPLMN ePDG may be selected by the UE using one or more WLAN Access Network Query Protocol (ANQP) mechanisms. ANQP is a query and response protocol that defines services offered by an AP and may be used to discover the domain name, accessible roaming partners along with credential type and authentication methods supported, IP address type availability and other information used for network selection. By using ANQP methods, the UE may be able to obtain the list of PLMN identifiers supported by the WLAN network. Additional information can be provided as part of ANQP methods to indicate which operators support S2b and have one or more ePDGs deployed. The UE may be able to prioritize HPLMN or equivalent HPLMN-based ePDGs (also referred to herein as HPLMN ePDG or HePDG) using this mechanism.

In some embodiments, the HPLMN ePDG may be selected by the UE using ANDSF rules. In these embodiments, the UE may retrieve home operator preferences from a policy server such as the Home ANDSF (HANDSF). The HANDSF may be able to indicate to the UE whether or not the UE should connect to the HePDG when the UE is roaming. The various roaming scenarios defined by the ANDSF rules may include, for example, whether or not to connect to the HPLMN ePDG when the UE roams to a specific VPLMN or a specific set of VPLMNs. The ANDSF rules may take into account information based on roaming agreements.

In some embodiments, static or pre-configured rules may be used in the event dynamic rules (obtained via ANDSF or ANQP) are unavailable. In some embodiments, the HPLMN ePDG may be selected by the UE using RAN rules. Whether or not RAN rules are used may be dependent on whether or not ANDSF rules are stored in the UE. In some embodiments, a priority may exist such that if both RAN rules and ANDSF rules are present in the UE, the ANDSF rules may be used. In some embodiments, the ANDSF rules may be used to the extent that the ANDSF rules and RAN rules conflict. In some embodiments in absence of ANDSF rules, and if the UE is using RAN rules from the VPLMN, the UE may use a static or pre-configured HPLMN configuration if one is available. The UE may store the RAN rules in the same memory or a different memory as that in which the configuration file is stored.

The various embodiments above may thus permit the home operator of the UE to take different actions based on pre-configured or dynamic policies and preferences available from the home operator when the UE is roaming. In some embodiments, the home operator may prefer the UE to connect to the HPLMN ePDG, in which case the UE may connect to the HPLMN ePDG. In some embodiments, the home operator may prefer the UE to connect to the VPLMN ePDG, in which case the home operator may provide a list of VPLMNs where the UE is able to connect to the VPLMN ePDG. In some embodiments, if no pre-configured or dynamic policies/preferences are available from home operator, the UE may follow VPLMN policies and select the ePDG accordingly.

Information pre-configured in the UEs by the home operator may be provided statically in the UE or in a configuration file in the UICC or in non-volatile storage in the UE. In some embodiments, the information may instead or in addition be obtained in a management object such as an ANDSF MO. The configuration in the UE may be updated by operators using an over-the-air server and remote file management capability. The configuration may be updated periodically or upon occurrence of a predetermined event, such as a change in the configuration by the home operator, a change in a roaming agreement including the home operator or the UE moving to a new VPLMN or accessing a different WLAN or using a different RAT.

The pre-configured information may include, among others, one or more preferences of the home operator in roaming scenarios, a prioritized list of PLMN-specific fully qualified domain names (FQDNs), and a list of VPLMNs where VPLMN policies are preferred compared to home operator policies.

More specifically, the home operator in roaming scenarios may be an indication from home operator that the HPLMN prefers the UE to use the HPLMN ePDG in roaming scenarios. If such an indication is present in the UE, the UE may prioritize HPLMN ePDGs over VPLMN ePDGs.

The prioritized list of PLMN specific FQDNs provided by home operator may, for each PLMN, contain a list of FQDNs that can be selected by the UE to connect to an ePDG. If HPLMN ePDGs are preferred, the UE may select the appropriate PLMN and FQDN available to the UE from the list. A default PLMN may be used by the UE when the UE is not connected to any PLMN over any RAT.

The UE may also contain a list of VPLMNs in which VPLMN policies are preferred compared to home operator policies. When roaming to such VPLMNs, the UE may select an ePDG that connects to the VPLMN ePDG rather than the HPLMN ePDG. If the connection selected to the VPLMN ePDG fails, HPLMN policies may be applied instead and the UE may subsequently connect to the HPLMN ePDG.

Figure 3:
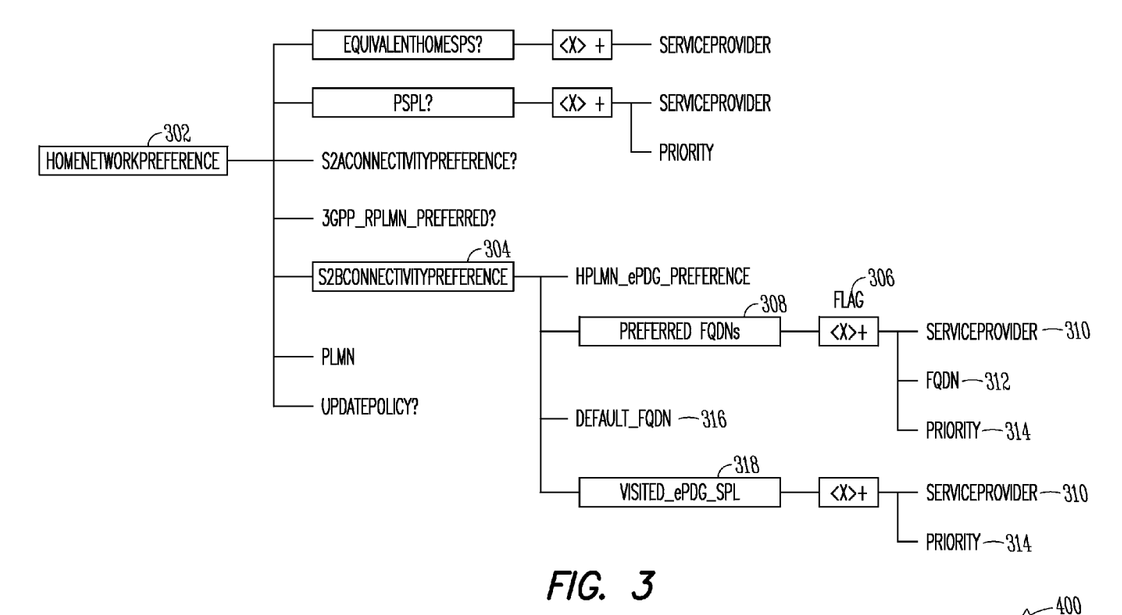
FIG. 3 illustrates Home Operator preferences in accordance with some embodiments.

FIG. 3 illustrates Home Operator preferences in accordance with some embodiments. More specifically, FIG. 3 illustrates Home Operator preferences delivered to the UE using the ANDSF MO.

Updates and other information may be provided using an ANDSF server for ePDG selection in roaming scenarios. The ANDSF server may organize device configuration data in a hierarchical management tree composed of at least one node and at least one leaf. The ANDSF information may be provided during tunnel establishment to determine home operator preferences to connect to an appropriate ePDG. The tree structure may contain various branches containing one or more nodes and leaves, including a HomeNetworkPreference node 302, a S2bConnectivityPreference node 304, a HPLMN_ePDG_Preference flag 306, a PreferredFQDNs node 308, a Service Provider leaf 310, a FQDN leaf 312, a Priority leaf 314, a Default_FQDN leaf 316, and a Visited_ePDG_SPL list 318. Thus, the ANDSF Mo may contain HomeNetworkPreference data, S2bConnectivityPreference data, a HPLMN_ePDG_Preference flag, PreferredFQDNs data, Service Provider data, FQDN data, Priority data, Default_FQDN data, and a Visited_ePDG_SPL list.

Specifically, in some embodiments, the HomeNetworkPreference node 302 may provide home operator preferences. The HomeNetworkPreference node 302 may have a number of nodes and leaves attached thereto. The S2bConnectivityPreference node 304 may be connected with the HomeNetworkPreference node 302 and may indicate the home operator preference for S2b connectivity and ePDG selection in various different scenarios. The PDN GW may be connected to the ePDG using the S2b interface for untrusted access. For example, the S2bConnectivityPreference node 304 may be defined within the XML format of the MO as <X>/HomeNetworkPreference?/<X>/S2bConnectivityPreference.

The S2bConnectivityPreference node 304 may be connected with other nodes and leaves. One such leaf may be the HPLMN_ePDG_Preference flag 306, which may be set to 1 or reset to 0. In response to the HPLMN_ePDG_Preference flag 306 being set (to 1), the UE may determine that the home operator prefers the UE to connect to the HPLMN ePDG in roaming scenarios.

The Default_FQDN leaf 316 may also be connected with the S2bConnectivityPreference node 304. The Default_FQDN leaf 316 may indicate the FQDN to be used if the UE is not connected to any PLMN of any access technology.

The Visited_ePDG_SPL list 318 may also be connected with the S2bConnectivityPreference node 304. The Visited_ePDG_SPL list 318 may contain the Visited Service Provider list of operators. If the UE may connect to the ePDG of the visited PLMN when the UE roams to any PLMN in the Visited Service Provider list.

The PreferredFQDNs node 308 may also be connected with the S2bConnectivityPreference node 304. The PreferredFQDNs node 308 may provide a prioritized list of FQDNs, corresponding to different PLMNs, preferred by the HPLMN. The UE may use this list to construct the FQDN based on the PLMN to which the UE is connected. The PreferredFQDNs node 308 may be connected with the Service Provider leaf 310, the FQDN leaf 312 and the Priority leaf 314. The Service Provider leaf 310 may provide the PLMN identifier of the visited operator. The FQDN leaf 312 may provide a FQDN that can be used to retrieve the IP Address of the desired ePDG using DNS-based mechanisms. The UE may connect to this ePDG in roaming scenarios. The Priority leaf 314 may indicate the priority order of PLMNs in the list. The Priority leaf 314 thus may indicate the priority of VPLMNs to use if there are multiple VPLMNs that the UE can roam to in a given area. For example, the Priority leaf 314 may be defined within the XML format of the MO as <X>/HomeNetworkPreference?/<X>/S2bConnectivityPreference/<X>/Preferred FQDNs/<X>/Priority.

In addition to or instead of updates being provided using ANDSF (or ANQP) for ePDG selection in roaming scenarios, updates may be based on RAN rules. In some embodiments, updating may be prioritized such that if both ANDSF and RAN rules are present, the updates may be obtained using the ANDSF rules. In such embodiments, in the absence of ANDSF rules and if the UE is using RAN rules from the VPLMN, the UE may use a static or pre-configured HPLMN configuration if one is available in the roaming scenarios and apply the HPLMN configuration for ePDG selection.

In some embodiments, the UE may use the information returned as part of the ANQP query to determine with which ePDG to connect. When a UE queries an AP using ANQP, the UE may receive a description of available services without having to commit to a network. The ANQP query may include an Info ID field, which may indicate that the response to the UE is to use a generic container. A generic WLAN container may be defined in which the UE is able to request a set of parameters and information about connectivity options supported through the S2b interfaces. The generic WLAN container may contain information that allows a WLAN access network to connect to the 3GPP Enhanced Packet Core (EPC), including information such as ANDSF-defined information.

Figure 4:
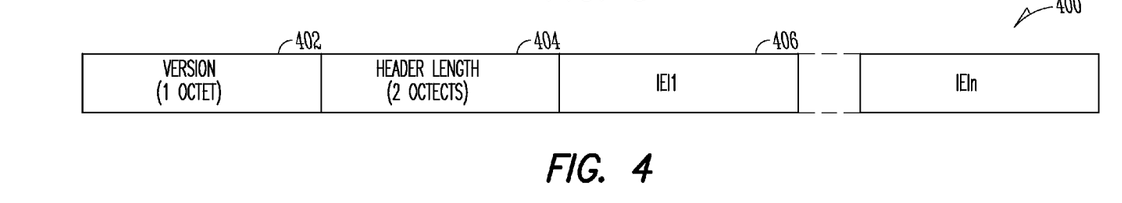
FIG. 4 illustrates generic WLAN container structure in accordance with some embodiments.

FIG. 4 illustrates generic WLAN container structure in accordance with some embodiments. The generic WLAN container 400 may include a version field 402, a header length field 404 and a payload field 406 containing a plurality of information element identifiers (IEIs).

The generic WLAN container 400 may have several different versions. Thus, the version field 402 may define the version of the general WLAN container. The version field 402 may be defined using a field having a length of a single octet. For example, version 1 of the general WLAN container may be defined by 00000000, with other versions being similarly defined. Unused values may be reserved for future (and perhaps dual purpose) use. Thus, unused values may be used to indicate a version number and other information unassociated with version number.

The header length field 404 may comprise a field 2 octets in length. The header length field 404 may define the number of octets after the header length in the generic WLAN container 400. Thus, the header length field 404 may indicate the length of the payload field 406.

The payload field 406 may be a generic container whose content is defined in the 3GPP specifications, specifically Technical Specification 23.234. Each IEI in the payload field 406 may define the associated information element contents. Using the above Home Operator preferences as an example, an IEI of 00000001 may indicate that the IE provides the HPLMN_ePDG_Preference, an IEI of 00000002 may indicate that the IE provides the Default_FQDN, an IEI of 00000003 may indicate that the IE provides the number of preferred FQDNs, an IEI of 00000004 may indicate that the IE provides the length of a sub-container for the number of preferred FQDNs in which each entry in the sub container may contain the PLMN-ID, FQDN, and priority, an IEI of 00000005 may indicate that the IE provides the number of preferred visited service providers, an IEI of 00000006 may indicate that the IE provides the length of a sub-container for the number of preferred visited service providers in which each entry in the sub-container may contain the PLMN-ID and priority, an IEI of 00000007 to 11111111 may be reserved for future use. For each of the IEIs, the first octet may be the IE identifier, followed by the length of the IEI and then any other IEI specific fields.

Figure 5:
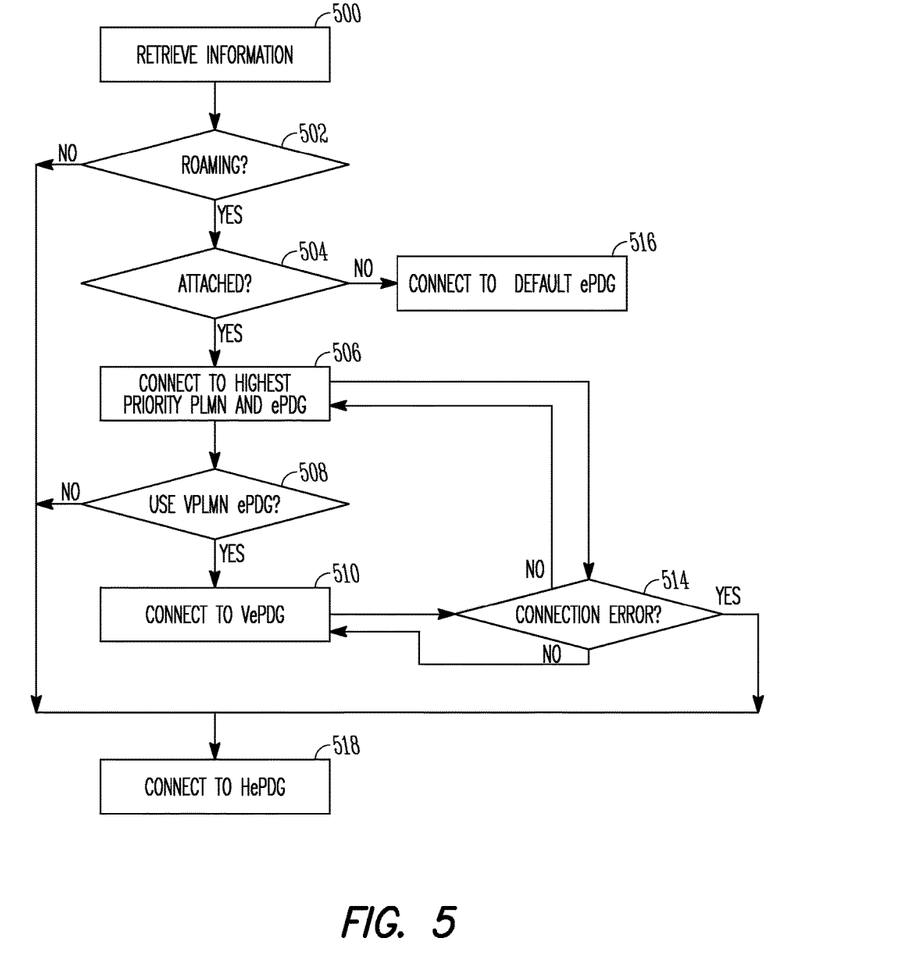
FIG. 5 illustrates a flowchart of Enhanced Packet Data Gateway (ePDG) selection in accordance with some embodiments.

FIG. 5 illustrates a flowchart of ePDG selection in accordance with some embodiments. As mentioned above, the operations shown in FIG. 5 may additionally apply to emergency services scenarios. The method shown in FIG. 5 may be used by the UE shown in FIG. 1 or 2, for example.

At operation 500, the UE may retrieve information indicating which ePDG to select. In some embodiments, static or pre-configured information in a configuration file stored in a memory of the UE may be used. In some embodiments, dynamic information obtained over the air, e.g., when accessing the WLAN network, from the home operator may be used. In some embodiments both dynamic and static information may be available to the UE, in which case the dynamic information (which is likely to be the most recent) may have priority over the static information and thus be used instead of the static information.

If dynamic information is used, the UE may attempt to retrieve ANDSF information. If successful, the UE may use the ANDSF information. If the ANDSF information is unable to be accessed, or if the ANDSF information is otherwise not used, the UE may attempt to retrieve selection information using ANQP. If the selection information is able to be obtained using ANQP, the UE may apply the ANQP-obtained selection information. If dynamic information is unable to be retrieved by the UE or if the UE uses RAN rules, the UE may instead apply static or pre-configured selection information.

Thus, the configuration file may be configured to store rules for ePDG selection. The configuration file may store information including a list of ePDGs and selection rules. In some embodiments, the rules may indicate a priority for different types of ePDG connections based on, for example, a specific network or RAT implemented or included in the network. The rules stored by the configuration file may be obtained in a variety of manners. In some embodiments, the configuration file may store pre-provisioned rules. For example, the rules stored by the configuration file may be stored during manufacturing or initial programming of the UE. In some embodiments, the configuration file may be configured to synchronize the rules with a network component. For example, the configuration file and ANDSF server may synchronize at least a portion of an MO stored by the UE so that the UE has the same version as a visited or home ANDSF server. The configuration file may store the rules by storing at least a portion of the MO. In some embodiments, the MO may be synchronized with the ANDSF server at activation of the UE. In some embodiments, the MO may be synchronized dynamically so that the configuration file stores an up-to-date version of the MO. For example, the ANDSF server may send a message to the UE indicating that the MO has been changed or updated and the UE may connect to the ANDSF server to synchronize the MO. In some embodiments, only portions of the MO that have changed are sent to the UE in order to save bandwidth and/or the MO may be updated over an alternative network connection, such as over a Wi-Fi RAN or WiMAX RAN.

The configuration file may obtain and/or store rules within an MO. For example, the rules may be obtained and/or stored in a structure comprising an ANDSF MO. In some embodiments, the MO may be open mobile alliance (OMA) device management (DM) compliant. In some embodiments, the rules and/or policies within the MO may be stored or indicated in an extensible markup language (XML) format. In some embodiments, an ANDSF MO includes preferences in an XML format. For example, the policies and preferences may be organized in a branch and leaf structure formatted according to XML. The preferences may be included in one or more of an ISMP and an ISRP.

At operation 502, the UE may determine whether or not it is roaming. The UE may determine whether it is roaming, i.e., outside its home network and using the resources from other operator's network, based on location, for example.

Regardless of whether dynamic or static information is used, the information obtained may include a Preferred-FQDNs List. This information is used at operation 504, in which the UE may determine whether or not it is attached to a PLMN as specified by a service provider in the Preferred-FQDNs List. If multiple PLMNs are available, the UE may use the PreferredFQDNs List to select the highest priority PLMN to which to attach.

If at operation 504 the UE determines that it is attached to a PLMN as specified by a service provider in the Preferred-FQDNs List, at operation 506 the UE may determine the FQDN corresponding to the highest priority PLMN. The UE may subsequently retrieve the IP Address of the ePDG of the highest priority PLMN using Domain Name System (DNS) mechanisms. The UE may subsequently connect to the ePDG of the highest priority PLMN.

As the UE is roaming in a visited service provider network, the UE may determine at operation 508 whether or not the HPLMN has indicated that the UE should use the ePDG corresponding to this visited service provider (VePDG). The UE may make this determination based on whether the HPLMN_ePDG_Preference set to 0 as determined using the retrieved information.

If at operation 508 the UE determines that it is to use the VePDG, the UE may create a FQDN based on the VPLMN. The UE may subsequently, at operation 510, connect to the VePDG using the created FQDN.

If the UE determines that it cannot connect to any PLMN, the UE may extract a Default FQDN from the retrieved information. The Default FQDN may correspond to a particular PLMN. The UE may then use the Default FQDN at operation 516 to connect to the ePDG corresponding to the particular PLMN.

If the UE determines at operation 508 that the HPLMN has indicated that the UE should not use the VePDG, i.e., the HPLMN_ePDG_Preference is set to 1, the UE may at operation 518 connect to the ePDG corresponding to the FQDN of the home operator (HePDG). Similarly, if the UE is not roaming but is in HPLMN, then the UE may connect to the ePDG corresponding to the FQDN of the home operator. In addition, the UE may detect a failure of operation 504, 510 or 514 there is an error UE goes directly to step 5.

Although not shown in FIG. 5, in some embodiments, whether or not the ePDG supports emergency services may be a factor in determining whether or not to select the ePDG. For example, if the ePDG selected by following the operations described supports emergency services, then the ePDG may be selected. In some embodiments, an ePDG based on Emergency FQDN may be selected.

In some embodiments, the UE may prioritize ePDG selection information obtained from different sources for conflict resolution. For example, the UE may have ePDG selection information in memory (UICC, ME memory, etc.) and in ANDSF MOs. In one such embodiment, the information in memory may take precedence over the ANDSF MO information.

Thus, in some embodiments, in a first operation, if a HePDG identifier is provisioned in the UE, the UE may use the configured IP address to select the HePDG. Alternatively, the UE may use a configured FQDN to run a DNS query to obtain the IP address (or addresses) of the ePDG(s) in the HPLMN.

In a second operation, if the HePDG identifier is not provisioned in the UE, the UE is attached to a PLMN and this PLMN is found in ePDG selection information in the UE, the UE may select the ePDG of the PLMN (the VePDG). Otherwise, the UE may select the ePDG of a default PLMN.

In a third operation, if the HePDG identifier is not provisioned in the UE and the UE is not attached to a PLMN, the UE may then select the HePDG. If the HPLMN FQDN is stored in the UE, the UE may then construct the HePDG FQDN from the stored information. Otherwise, the UE may construct an operator identifier FQDN from an operator PLMN ID of the HPLMN and then run a DNS query to obtain the ePDG IP address.

Various examples of the disclosure are provided below. These examples are not intended to in any way limit the disclosure herein. In Example 1, an apparatus of user equipment (UE) may comprise a transceiver arranged to communicate with a Third Generation Partnership Project Long Term Evolution (3GPP LTE) network through an access point (AP) of an unsecured network; and processing circuitry arranged to: retrieve Enhanced Packet Data Gateway (ePDG) selection information indicating to which of a home public land mobile network (HPLMN) ePDG (HePDG) and a VPLMN ePDG (VePDG) to attempt to connect when the UE is when roaming to a visited public land mobile network (VPLMN) and attempting to connect to the AP; and configure the transceiver to connect to one of the HePDG and the VePDG indicated by the ePDG selection information.

In Example 2, the subject matter of Example 1 can optionally include that the ePDG selection information is pre-configured information in a configuration file stored in a memory, the ePDG selection information comprising a list of ePDGs and selection rules.

In Example 3, the subject matter of one or any combination of Examples 1-2 can optionally include that the processing circuitry is further arranged to retrieve the ePDG selection information from an Access Network Discovery and Selection Function (ANDSF) server.

In Example 4, the subject matter of one or any combination of Examples 1-3 can optionally include that the ePDG selection information comprises an ANDSF management object (MO), independent of whether the ePDG selection information is dynamic or static information.

In Example 5, the subject matter of one or any combination of Examples 1-4 can optionally include that the processing circuitry is further arranged to configure the transceiver to retrieve the ePDG selection information through the AP using wireless local area network (WLAN) Access Network Query Protocol (ANQP), an ANQP response comprising a list of public land mobile network (PLMN) identifiers supported by the WLAN network and which operators support S2b and have one or more ePDGs deployed.

In Example 6, the subject matter of one or any combination of Examples 1-5 can optionally include that an ANQP query comprises an Info ID field indicating that the ANQP response to the UE is to use a generic container, the generic container comprising a version field indicating a version of the generic container, a header length field defining a number of octets after a length of the header length field and a payload field comprising a plurality of information element identifiers (IEIs).

In Example 7, the subject matter of one or any combination of Examples 1-6 can optionally include that the ePDG selection information is selected using radio access network (RAN) rules stored in a memory, the ePDG selection information comprising a list of ePDGs and selection rules.

In Example 8, the subject matter of one or any combination of Examples 1-7 can optionally include that the UE further comprises a memory, the ePDG selection information is pre-configured information in a configuration file stored in the memory, and the processing circuitry is further arranged to: configure the transceiver to retrieve the ePDG selection information dynamically through the AP from a server, and if the ePDG selection information is unable to be retrieved dynamically, retrieve the ePDG selection information from the memory.

In Example 9, the subject matter of Example 8 can optionally include that the processing circuitry is further arranged to configure the transceiver to retrieve the ePDG selection information dynamically through the AP using an Access Network Discovery and Selection Function (ANDSF) server; and configure the transceiver to retrieve the ePDG selection information dynamically using wireless local area network (WLAN) Access Network Query Protocol (ANQP) if the ePDG selection information is unable to be retrieved from the ANDSF server.

In Example 10, the subject matter of one or any combination of Examples 1-9 can optionally include that at least one of a) in response to determining that the UE is not roaming, the processing circuitry is further arranged to: retrieve an Internet Protocol (IP) address using a fully qualified domain name (FQDN) of the HePDG and domain name server (DNS)-based mechanisms; and configure the transceiver to connect to the HePDG through the AP using the IP address, and b) in response to determining that the UE is to connect to the VePDG, create a fully qualified domain name (FQDN) based on the VPLMN, and connect to the VePDG based on the FQDN of the VePDG.

In Example 11, the subject matter of one or any combination of Examples 1-10 can optionally include that independent of whether the ePDG selection information comprises dynamic or static information, the ePDG selection information comprises a list comprising a plurality of prioritized VPLMNs where HPLMN policies are not preferred.

In Example 12, the subject matter of Example 11 can optionally include that the processing circuitry is further arranged to configure the transceiver to create a fully qualified domain name (FQDN) of the highest priority VPLMN of the plurality of prioritized VPLMNs of the list, retrieve an internet protocol (IP) address of an ePDG of the highest priority VPLMN using a domain name server (DNS) mechanism, and connect to the ePDG of the highest priority PLMN through the AP using the retrieved IP address.

In Example 13, the subject matter of one or any combination of Examples 1-12 can optionally include that the ePDG selection information comprises a HPLMN_ePDG_Preference flag, and the processing circuitry is further arranged to, in response to determining that the UE is roaming, determine whether or not the HPLMN has indicated that the UE is to use the VePDG dependent on a setting of the HPLMN_ePDG_Preference flag.

In Example 14, the subject matter of one or any combination of Examples 1-13 can optionally include that the processing circuitry is further arranged to determine that the UE cannot connect to any PLMN, in response to determining that the UE cannot connect to any PLMN, extract from the ePDG selection information a default fully qualified domain name (FQDN) corresponding to a particular PLMN, and connect to the ePDG corresponding to the particular PLMN through the AP based on the default FQDN.

In Example 15, the subject matter of one or any combination of Examples 1-14 can optionally include that the processing circuitry is further arranged to in response to determining that Voice-over-WiFi (VoWiFi) services are desired by the UE, determine which of the HePDG or VePDG to connect to based on: a roaming agreement between the VPLMN and HPLMN permitting use of the VoWiFi services, and if the roaming agreement between the VPLMN and HPLMN permits the use of VoWiFi services, whether VoWiFi services are deployed by the VPLMN and are operative.

In Example 16, the subject matter of one or any combination of Examples 1-15 can optionally include an antenna configured to transmit and receive communications between the transceiver and the AP.

Example 17 comprises an apparatus of an access point (AP) comprising: a transceiver arranged to communicate with a Third Generation Partnership Project Long Term Evolution (3GPP LTE) network and with a user equipment (UE); and processing circuitry arranged to: configure the transceiver to transmit to the UE Enhanced Packet Data Gateway (ePDG) selection information indicating to which of a home public land mobile network (HPLMN) ePDG (HePDG) and a VPLMN ePDG (VePDG) to attempt to connect one of from an Access Network Discovery and Selection Function (ANDSF) server or in response to a wireless local area network (WLAN) Access Network Query Protocol (ANQP) query; and configure the transceiver to connect the UE to one of the HePDG and the VePDG indicated by the ePDG selection information.

In Example 18, the subject matter of Example 17 can optionally include that the processing circuitry is further arranged to configure the transceiver to transmit the ePDG selection information from the ANDSF server using an ANDSF management object (MO), the ANDSF MO comprising HomeNetworkPreference data, S2bConnectivityPreference data, a HPLMN_ePDG_Preference flag, PreferredFQDNs data, Service Provider data, FQDN data, Priority data, Default_FQDN data, and a Visited_ePDG_SPL list.

In Example 19, the subject matter of Example 17 or 18 can optionally include that the processing circuitry is further arranged to configure the transceiver to transmit the ePDG selection information using the WLAN ANQP response comprising a list of public land mobile network (PLMN) identifiers supported by the WLAN network and which operators support S2b and have one or more ePDGs deployed.

In Example 20, the subject matter of Example 19 can optionally include that the ANQP query comprises an Info ID field indicating that the ANQP response to the UE is to use a generic container, the generic container comprising a version field indicating a version of the generic container, a header length field defining a number of octets after a length of the header length field and a payload field comprising a plurality of information element identifiers (IEIs).

In Example 21, the subject matter of one or any combination of Examples 17-20 can optionally include that the UE is not roaming, and the processing circuitry is further arranged to configure the transceiver to connect the UE to the HePDG based on an Internet Protocol (IP) address obtained using a fully qualified domain name (FQDN) of the HePDG and domain name server (DNS)-based mechanisms.

In Example 22, the subject matter of one or any combination of Examples 17-22 can optionally include that at least one of: a) the ePDG selection information comprises a list comprising a plurality of prioritized VPLMNs where HPLMN policies are not preferred, and the processing circuitry is further arranged to configure the transceiver to: transmit an internet protocol (IP) address of an ePDG of a highest priority VPLMN of the plurality of prioritized VPLMNs of the list to the UE using a domain name server (DNS) mechanism, and connect the UE to the ePDG of the highest priority PLMN using the IP address; and b) the ePDG selection information comprises a HPLMN_ePDG_Preference flag that permits the UE to, when roaming, determine whether or not the HPLMN has indicated that the UE is to use the VePDG dependent on a setting of the HPLMN_ePDG_Preference flag.

In Example 23, a non-transitory computer-readable storage medium that stores instructions for execution by one or more processors of a user equipment (UE) to configure the UE to communicate with a Third Generation Partnership Project Long Term Evolution (3GPP LTE) network through an access point (AP) of an unsecured network, the one or more processors to configure the UE to: when the UE is not roaming, connect to a home public land mobile network (HPLMN) ePDG (HePDG) through the AP; when the UE is roaming, retrieve Enhanced Packet Data Gateway (ePDG) selection information indicating to which of the HePDG and a visited public land mobile network (VPLMN) ePDG (VePDG) to attempt to connect, and connect through the AP to whichever of the HePDG and the VePDG is indicated by the ePDG selection information; and when the UE is roaming and cannot connect to any PLMN, extract from the ePDG selection information a default fully qualified domain name (FQDN) corresponding to a particular PLMN and connect to the ePDG corresponding to the particular PLMN through the AP based on the default FQDN.

In Example 24, the subject matter of Example 23 can optionally include that: the ePDG selection information comprises a list of ePDGs and selection rules, the ePDG selection information is one of: pre-configured information in a configuration file stored in a memory of the UE or dynamic information retrieved through the AP from an Access Network Discovery and Selection Function (ANDSF) server or from a wireless local area network (WLAN) Access Network Query Protocol (ANQP) response comprising a list of PLMN identifiers supported by the WLAN network and which operators support S2b and have one or more ePDGs deployed, in which the ePDG selection information is retrieved from the memory after being unable to be retrieved dynamically.

In Example 25, the subject matter of Example 23 or 24 can optionally include that: independent of whether the ePDG selection information comprises dynamic or static information, the ePDG selection information comprises a list comprising a plurality of prioritized VPLMNs where HPLMN policies are not preferred, and the one or more processors to configure the UE to: create a fully qualified domain name (FQDN) of the highest priority VPLMN of the plurality of prioritized VPLMNs of the list, retrieve an internet protocol (IP) address of an ePDG of the highest priority VPLMN using a domain name server (DNS) mechanism, and connect to the ePDG of the highest priority PLMN through the AP using the retrieved IP address.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE) comprising:
a transceiver arranged to communicate with a Third Generation Partnership Project Long Term Evolution (3GPP LTE) network through an access point (AP) of an unsecured network; and
processing circuitry arranged to:
retrieve Enhanced Packet Data Gateway (ePDG) selection information indicating to which of a home public land mobile network (HPLMN) ePDG (HePDG) and a VPLMN ePDG (VePDG) to attempt to connect when the UE is roaming to a visited public land mobile network (VPLMN) and attempting to connect to the AP; and
configure the transceiver to connect to one of the HePDG and the VePDG indicated by the ePDG selection information, wherein when the transceiver is configured to retrieve the ePDG selection information through the AP in accordance with a wireless local area network (WLAN) Access Network Query Protocol (ANQP), as part of the ANQP, the processing circuitry is configured to:
encode an ANQP query for transmission to the AP, the ANQP query comprising an Info ID field indicating that the ANQP response to the UE is to use a generic container, the generic container comprising a version field indicating a version of the generic container, a header length field defining a number of octets after a length of the header length field and a payload field comprising a plurality of information element identifiers (IEIs), and
decode an ANQP response from the AP, the ANQP response comprising:
a list of public land mobile network (PLMN) identifiers supported by the WLAN network, and
which operators support S2b and have one or more ePDGs deployed.

2. The apparatus of claim 1, wherein:
the ePDG selection information is pre-configured information in a configuration file stored in a memory, the ePDG selection information comprising a list of ePDGs and selection rules.

3. The apparatus of claim 1, wherein the processing circuitry is further arranged to:
configure the transceiver to retrieve the ePDG selection information from an Access Network Discovery and Selection Function (ANDSF) server.

4. The apparatus of claim 3, wherein:
the ePDG selection information comprises an ANDSF management object (MO), independent of whether the ePDG selection information is dynamic or static information.

5. The apparatus of claim 1, wherein:
the ePDG selection information is selected using radio access network (RAN) rules stored in a memory, the ePDG selection information comprising a list of ePDGs and selection rules.

6. The apparatus of claim 1, wherein:
the UE further comprises a memory,
the ePDG selection information is pre-configured information in a configuration file stored in the memory, and
the processing circuitry is further arranged to:
configure the transceiver to retrieve the ePDG selection information dynamically through the AP from a server, and
if the ePDG selection information is unable to be retrieved dynamically, retrieve the ePDG selection information from the memory.

7. The apparatus of claim 6, wherein the processing circuitry is further arranged to:
configure the transceiver to retrieve the ePDG selection information dynamically through the AP using an Access Network Discovery and Selection Function (ANDSF) server; and
configure the transceiver to retrieve the ePDG selection information dynamically using ANQP if the ePDG selection information is unable to be retrieved from the ANDSF server.

8. The apparatus of claim 1, wherein at least one of:
a) in response to determining that the UE is not roaming, the processing circuitry is further arranged to:
retrieve an Internet Protocol (IP) address using a fully qualified domain name (FQDN) of the HePDG and domain name server (DNS)-based mechanisms; and
configure the transceiver to connect to the HePDG through the AP using the IP address, and
b) in response to determining that the UE is to connect to the VePDG, create a fully qualified domain name (FQDN) based on the VPLMN, and connect to the VePDG based on the FQDN of the VePDG.

9. The apparatus of claim 1, wherein:
independent of whether the ePDG selection information comprises dynamic or static information, the ePDG selection information comprises a list comprising a plurality of prioritized VPLMNs where HPLMN policies are not preferred.

10. The apparatus of claim 9, wherein the processing circuitry is further arranged to configure the transceiver to:
create a fully qualified domain name (FQDN) of the highest priority VPLMN of the plurality of prioritized VPLMNs of the list,
retrieve an internet protocol (IP) address of an ePDG of the highest priority VPLMN using a domain name server (DNS) mechanism, and
connect to the ePDG of the highest priority PLMN through the AP using the retrieved IP address.

11. The apparatus of claim 1, wherein:
the ePDG selection information comprises a HPLMN_ePDG_Preference flag, and
the processing circuitry is further arranged to, in response to determining that the UE is roaming, determine whether or not the HPLMN has indicated that the UE is to use the VePDG dependent on a setting of the HPLMN_ePDG_Preference flag.

12. The apparatus of claim 1, wherein the processing circuitry is further arranged to:
determine that the UE cannot connect to any PLMN,
in response to determining that the UE cannot connect to any PLMN, extract from the ePDG selection information a default fully qualified domain name (FQDN) corresponding to a particular PLMN, and
connect to the ePDG corresponding to the particular PLMN through the AP based on the default FQDN.

13. The apparatus of claim 1, wherein the processing circuitry is further arranged to:
in response to determining that Voice-over-WiFi (VoWiFi) services are desired by the UE, determine which of the HePDG or VePDG to connect to based on:
a roaming agreement between the VPLMN and HPLMN permitting use of the VoWiFi services, and
if the roaming agreement between the VPLMN and HPLMN permits the use of VoWiFi services, whether VoWiFi services are deployed by the VPLMN and are operative.

14. The apparatus of claim 1, further comprising an antenna configured to transmit and receive communications between the transceiver and the AP.

15. A non-transitory computer-readable storage medium that stores instructions for execution by one or more processors of a user equipment (UE) to configure the UE to communicate with a Third Generation Partnership Project Long Term Evolution (3GPP LTE) network through an access point (AP) of an unsecured network, the one or more processors to configure the UE to:
when the UE is not roaming, connect to a home public land mobile network (HPLMN) ePDG (HePDG) through the AP;
when the UE is roaming, retrieve Enhanced Packet Data Gateway (ePDG) selection information indicating to which of the HePDG and a visited public land mobile network (VPLMN) ePDG (VePDG) to attempt to connect, and connect through the AP to whichever of the HePDG and the VePDG is indicated by the ePDG selection information; and when the UE is roaming and cannot connect to any PLMN, extract from the ePDG selection information a default fully qualified domain name (FQDN) corresponding to a particular PLMN and connect to the ePDG corresponding to the particular PLMN through the AP based on the default FQDN; and when the ePDG selection information is retrieved through the AP in accordance with a wireless local area network (WLAN) Access Network Query Protocol (ANQP), the instructions further configure the UE to:

encode an ANQP query for transmission to the AP, the ANQP query comprising an Info ID field indicating that the ANQP response to the UE is to use a generic container, the generic container comprising a version field indicating a version of the generic container, a header length field defining a number of octets after a length of the header length field and a payload field comprising a plurality of information element identifiers (IEIs), and decode an ANQP response from the AP, the ANQP response comprising:
a list of public land mobile network (PLMN) identifiers supported by the WLAN network, and
which operators support S2b and have one or more ePDGs deployed.

16. The medium of claim 15, wherein:
the ePDG selection information comprises a list of ePDGs and selection rules,
the ePDG selection information is one of:
pre-configured information in a configuration file stored in a memory of the UE or
dynamic information retrieved through the AP from an Access Network Discovery and Selection Function (ANDSF) server or from the ANQP response, in which the ePDG selection information is retrieved from the memory after being unable to be retrieved dynamically.

17. The medium of claim 15, wherein:
independent of whether the ePDG selection information comprises dynamic or static information, the ePDG selection information comprises a list comprising a plurality of prioritized VPLMNs where HPLMN policies are not preferred, and
the one or more processors to configure the UE to:
create a fully qualified domain name (FQDN) of the highest priority VPLMN of the plurality of prioritized VPLMNs of the list, retrieve an internet protocol (IP) address of an ePDG of the highest priority VPLMN using a domain name server (DNS) mechanism, and
connect to the ePDG of the highest priority PLMN through the AP using the retrieved IP address.

* * * * *

UNITED STATES PATENT AND TRADEMARK OFFICE
CERTIFICATE OF CORRECTION

PATENT NO. : 10,362,473 B2
APPLICATION NO. : 15/567330
DATED : July 23, 2019
INVENTOR(S) : Vivek Gupta Page 1 of 1

It is certified that error appears in the above-identified patent and that said Letters Patent is hereby corrected as shown below:

On the Title Page

Column 2, item [56], under "Other Publications", delete "15892781.0," and insert --15892783.0,-- therefor Page 2, Column 2, item [56], under "Other Publications", Line 30, delete "52b"," and insert --S2b",-- therefor Signed and Sealed this
Twenty-first Day of April, 2020

Andrei Iancu
*Director of the United States Patent and Trademark Office*